US010773628B1

(12) United States Patent
Super

(10) Patent No.: US 10,773,628 B1
(45) Date of Patent: Sep. 15, 2020

(54) ADJUSTABLE LARGE CUP HOLDER INSERT

(71) Applicant: David Super, Ocala, FL (US)

(72) Inventor: David Super, Ocala, FL (US)

( * ) Notice: Subject to any disclaimer, the term of this patent is extended or adjusted under 35 U.S.C. 154(b) by 0 days.

(21) Appl. No.: 16/661,466

(22) Filed: Oct. 23, 2019

(51) Int. Cl.
B60N 3/10 (2006.01)
(52) U.S. Cl.
CPC .................... B60N 3/103 (2013.01)
(58) Field of Classification Search
CPC .......... B60N 3/103; B60N 3/107; B60N 3/10; B60N 3/108; Y10S 224/926; B60R 7/04; B60R 2011/0075; A47G 23/0216; A47G 23/0225
USPC ....................................... 224/926
See application file for complete search history.

(56) References Cited

U.S. PATENT DOCUMENTS

| 97,724 A | 12/1869 | Straub | |
| 5,285,953 A * | 2/1994 | Smith | B60N 3/103 220/737 |
| 5,490,653 A * | 2/1996 | Ingwersen | B60N 3/102 248/311.2 |
| 6,543,637 B1 * | 4/2003 | Osborn | A47G 23/0216 220/737 |
| 8,061,670 B1 * | 11/2011 | White | B60R 11/02 248/311.2 |
| 10,040,383 B2 * | 8/2018 | Baker | B60N 3/103 |

* cited by examiner

Primary Examiner — Adam J Waggenspack
(74) Attorney, Agent, or Firm — Sanchelima & Associates, P.A.; Christian Sanchelima; Jesus Sanchelima

(57) ABSTRACT

A cup holder insert having an insert assembly, a support assembly, and a cup holder assembly is disclosed herein. The adjustable large cup holder insert includes three assemblies each having a specific shape to cooperate with each other. Additionally, the adjustable large cup holder insert is configured to be fitted into an existing cup holder in a vehicle or wherever else a cup holder is found. Each assembly of the adjustable large cup holder insert is fitted into each other to provide a secure attaching means to an existing cup holder. Furthermore, the three assemblies include a cup holder assembly which can be shifted across a support assembly to provide an optimal position for a placing a large cup for a user. The cup holder insert provides a user with an efficient way of securing a large cup to an existing cup holder.

10 Claims, 5 Drawing Sheets

ADJUSTABLE LARGE CUP HOLDER INSERT

II. BACKGROUND OF THE INVENTION

1. Field of the Invention

The present invention relates to an insert for a cup holder and, more particularly, to an adjustable large cup holder insert that is configured to allow a user to easily mount a large cup in a vehicle.

2. Description of the Related Art

Several designs for an adjustable large cup holder insert have been designed in the past. None of them, however, include an adjustable large cup holder insert for a standard cup holder. The adjustable large cup holder insert includes three assemblies each having a specific shape to cooperate with each other. Additionally, the adjustable large cup holder insert is configured to be fitted into an existing cup holder in a vehicle or wherever else a cup holder is found. Each assembly of the adjustable large cup holder insert is fitted into each other to provide a secure attaching means to an existing cup holder. Furthermore, the three assemblies include a cup holder assembly which can be shifted across a support assembly to provide an optimal position for a placing a large cup for a user. It is known that large cups often do not fit in conventional cup holders located in vehicles. It is also known that a user often likes to enjoy these large drinks but do not have an efficient or secure method for attaching their cup to an existing cup holder of a vehicle. Therefore, there is a need for an adjustable large cup holder insert for a standard cup holder.

Applicant believes that a related reference corresponds to U.S. patent No. 2012/0097724 issued for an adapter for a vehicle cup holder for fitting a larger cup holder inside of it. Applicant believes that another reference corresponds to U.S. Pat. No. 6,543,637 issued for a cup holder for a vehicle comprising size changing inserts. However, these references differ from the present invention because they fail to disclose an adjustable cup holder insert for a standard cup holder. The adjustable cup holder insert includes three assemblies each mounted to one another to be fitted into an existing cup holder. Additionally, a cup holder assembly includes a number of openings underneath to allow a user to laterally adjust the position of the cup holder assembly in order to obtain an optimal position for placing the cup holder assembly in an existing cup holder.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an adjustable cup holder insert that is configured to fit comfortably in any existing cup holder to allow for the efficient holding of a large cup.

It is another object of this invention to provide an adjustable cup holder insert that is laterally adjustable in order for a user to find a comfortable position to fit the adjustable cup holder insert into an existing cup holder.

It is still another object of the present invention to provide an adjustable cup holder insert that includes a cup holder assembly of a suitable size to hold a large cup with a handle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
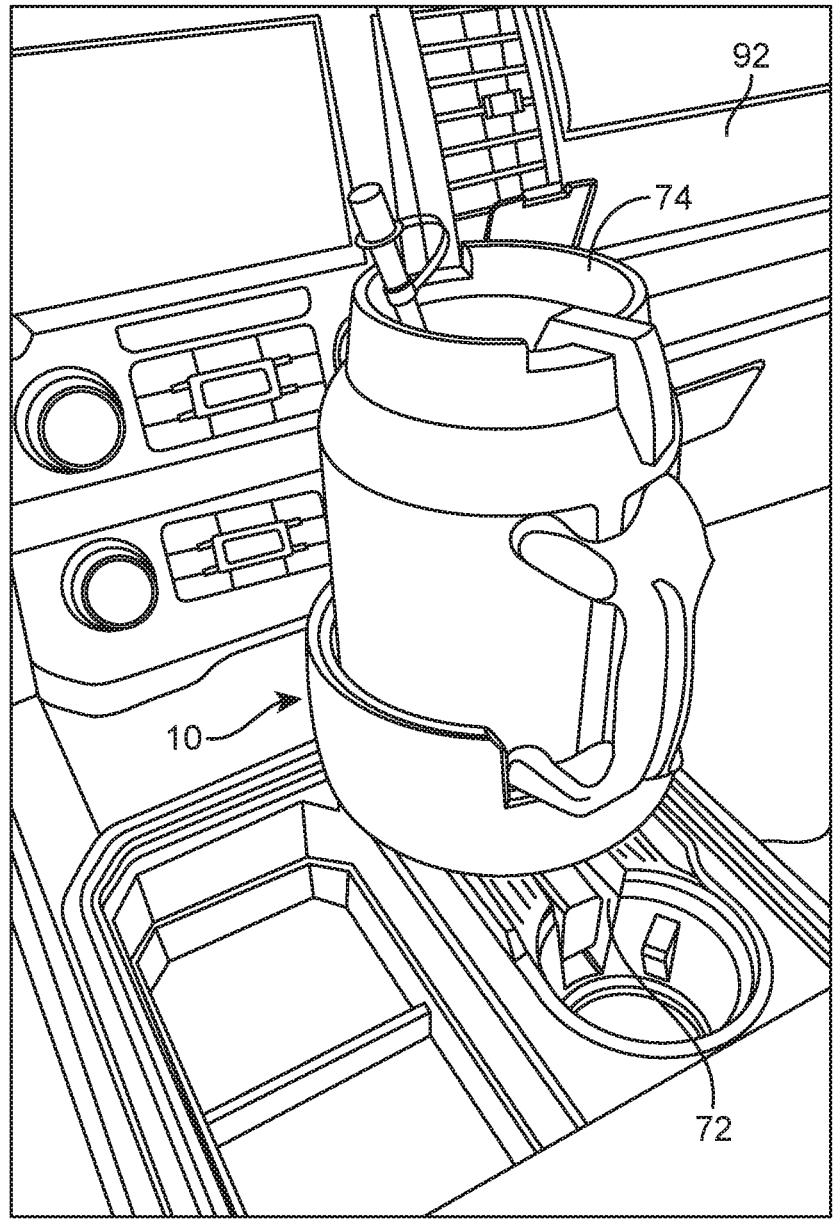
FIG. 1 represents an isometric view of a cup holder insert 10 in its operating environment in accordance to and embodiment of the present invention.
Figure 2:
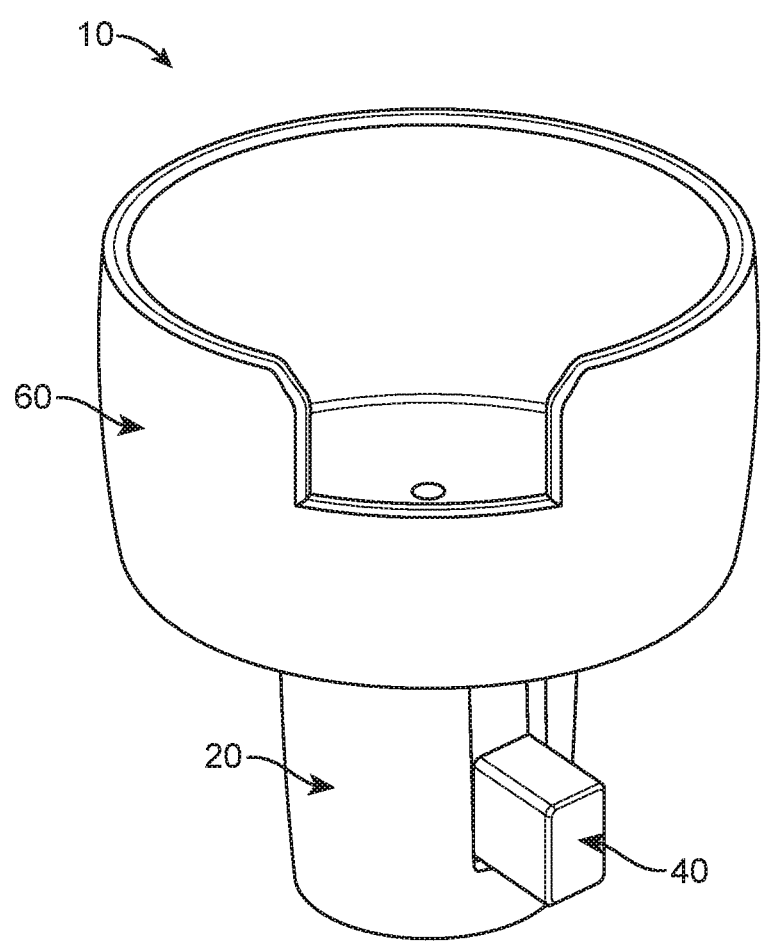
FIG. 2 shows an isometric view of a cup holder insert 10 having all of its assemblies in an assembled configuration in accordance to an embodiment of the present invention.
Figure 3:
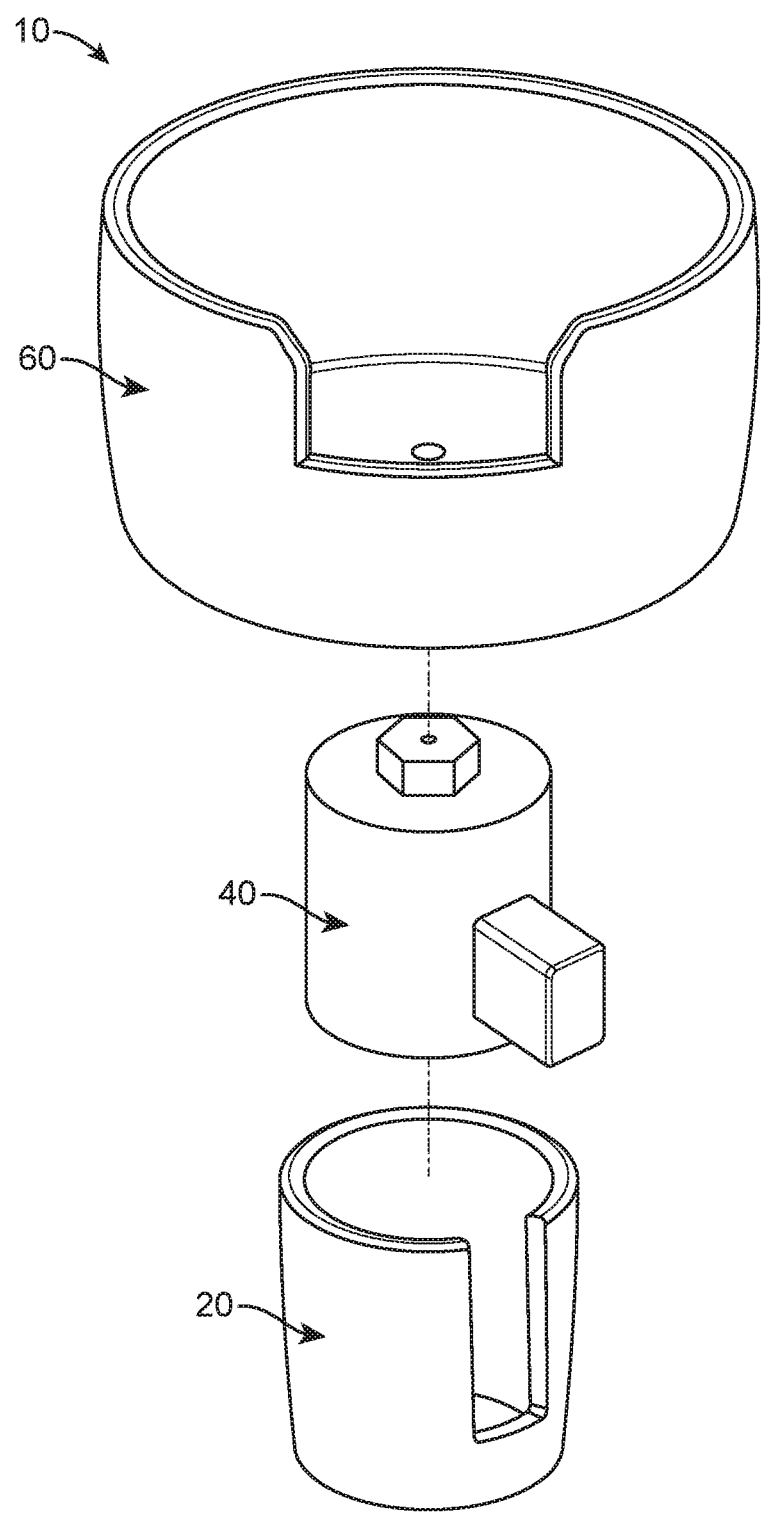
FIG. 3 illustrates an exploded view of a cup holder insert 10 in accordance to an embodiment of the present invention.
Figure 4:
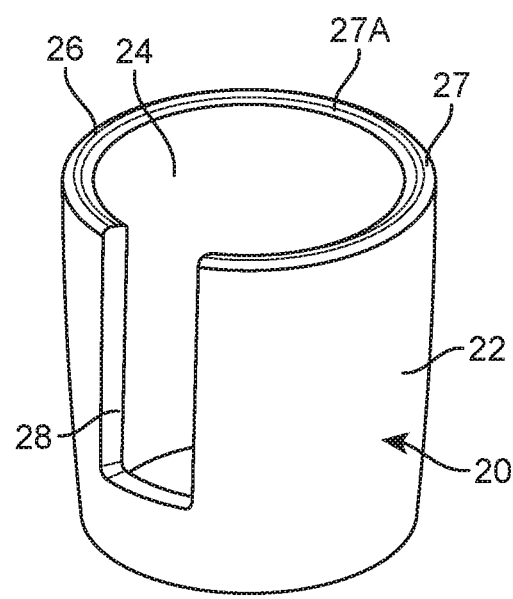
FIG. 4 is a representation of an isometric view of holder assembly 20 in accordance to an embodiment of the present invention.
Figure 5:
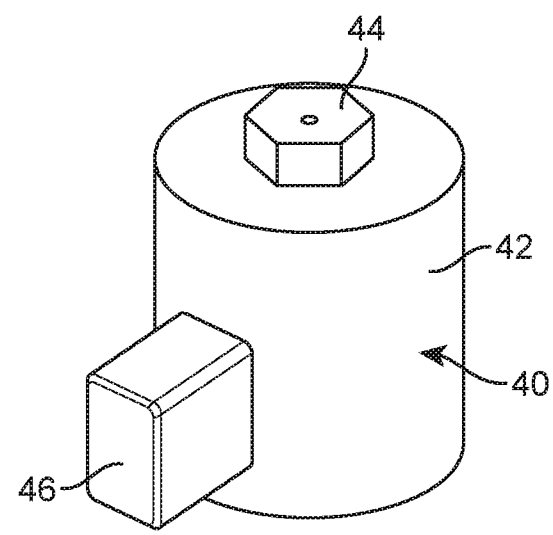
FIG. 5 shows an isometric view of a support assembly 40 in accordance to an embodiment of the present invention.
Figure 6:
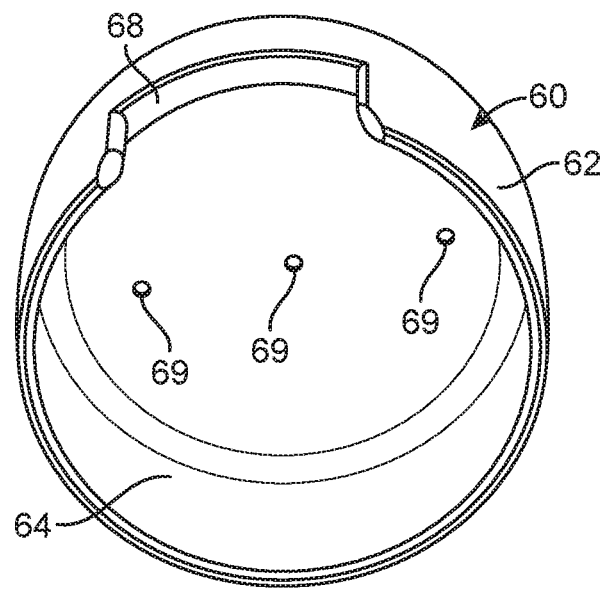
FIG. 6 illustrates an isometric top view of a cup holder assembly 60 in accordance to an embodiment of the present invention.
Figure 7:
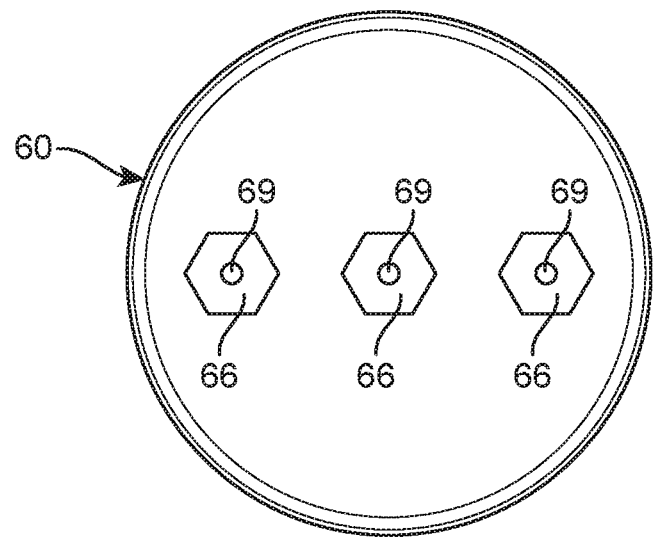
FIG. 7 represents a bottom view of a cup holder assembly 60 in accordance to an embodiment of the present invention.

Referring now to the drawings, where the present invention is generally referred to with numeral 10, it can be observed a cup holder insert 10 that includes a holder assembly 20, a support assembly 40, and a cup holder assembly 60, a cup holder 72, a mug 74, and a vehicle 92.

Holder assembly 20 includes a holder body 22. In one embodiment, holder body 22 is provided in a cylindrical shape. Holder body 22 may be made of any suitable material to hold support assembly 40 therein. This may include materials such as but not limited to plastic, metal, and the like. Holder body 22 further includes a hollow portion 24 therein. In one embodiment, hollow portion 24 is of a shape that cooperates with the shape of support assembly 40. Additionally, holder body 22 includes a thickness 26 extending from an outer area of holder body 22 into hollow portion 24 of holder body 22. Furthermore, holder body 22 includes an outer rim 27 having a slanted portion 27A. Holder body 22 further includes a cut portion 28 located vertically along holder body 22. In one embodiment, cut portion 28 is rectangular in shape and extends a length from a top end of holder body 22 and extends up to a predetermined distance above a bottom end of holder body 22. In one embodiment, holder assembly 20 is inserted within cup holder 72 inside of vehicle 92. It should be understood that holder assembly 20 may be inserted in any cup holder located within or outside of vehicle 92.

Support assembly 40 includes a support body 42 being cylindrical in shape. Support assembly 40 may be made of materials such as but not limited to plastic, metal, and the like. In one embodiment, the volume of support body 42 is a volume that cooperates with hollow portion 24 of holder assembly 20. Furthermore, the diameter of support body 42 cooperates with the diameter of hollow portion 24. Additionally, support body 42 is mounted therein holder body 22. In one embodiment, support body 42 remains flush with thickness 26 of holder body 22. In one embodiment, support body 42 may be uniformly solid. In another embodiment, support body 42 may have a hollow configuration therein. Additionally, support assembly 42 includes a first protrusion 44 located on a top end of support body 42. In one embodiment, first protrusion 44 is hexagonal in shape and protrudes a predetermined distance out of a center of the top end of support body 42. Furthermore, support assembly 40 may include a second protrusion 46 protruding outwardly from a sidewall of support body 42. In one embodiment second protrusion 46 may have a cubic rectangular shape. Additionally, second protrusion 46 may be located a predetermined distance above a bottom end of the sidewall of support body 42. Second protrusion 42 may also be located a predetermined distance below a top end of the side of support body 42. In one embodiment, the predetermined distance above the bottom end is less than the predetermined distance below the top end. In one embodiment, support body 42 is mounted within holder body 22. Second protrusion 46 then fits cooperatively between cut portion 28 of holder body 22. Additionally, second protrusion 46 extends a predetermined amount outwardly from cut portion 28. This configuration results in a secure attachment for holder assembly 20 and support assembly 40.

Cup holder assembly 60 includes a cup holder body 62 having a cylindrical shape. In one embodiment, cup holder assembly 60 may be made of any suitable material such as but not limited to metal, plastic, and the like. Cup holder body 62 includes a diameter being significantly larger than the diameter of holder body 22 and support body 42. Additionally, cup holder body 62 may include a cup holder hollow portion 64 therein. Cup holder hollow portion 64 is significantly larger than hollow portion 24 of holder assembly 20. Cup holder hollow portion 64 is configured to hold a mug 74. Mug 74 may be of a large mug variety that is not supported by traditional cup holders within vehicles. It should be understood, that mug 74 is not limited to being that of a large variety and may be any suitable beverage holder that fits within cup holder hollow portion 64. Holder body 42 further includes apertures 66 which may be located vertically along the diameter of a bottom end of cup holder body 62. In one embodiment, apertures 66 may be equidistantly spaced along the diameter of the bottom end. Additionally, apertures 66 may be hexagonal in shape and have a volume that is partially greater than that of first protrusion 44. Apertures 66 may receive first protrusion 44 therein and remain entirely flush therein. Additionally, cup holder assembly 60 includes a cup holder cut portion 68. In one embodiment, cup holder cut portion 68 being rectangular in shape and extending a portion of a lip of cup holder body 62. Cup holder cut portion 68 provides a comfortable opening to receive the handle of mug 74 therein. Additionally, cup holder body 62 includes circular openings 69 located along a diameter of a top surface of a bottom end of cup holder body 62. In one embodiment, circular openings 69 are located on the center of apertures 66. Additionally, circular openings 69 may extend therethrough to apertures 66.

In one embodiment, holder assembly 20 is mounted within a cup holder 72 of vehicle 92. Afterwards, support assembly 40 is mounted therein holder assembly 20 located within cup holder 72. A user then mounts cup holder assembly 60 onto support assembly 40 by connecting first protrusion 44 to any of apertures 66 of cup holder assembly 60. A user may then adjust the position of cup holder assembly 60 to comfortably fit their needs by using different mounts of apertures 66 and first protrusion 44. Cup holder insert 10 provides a comfortable method for a user to hold a large beverage in vehicle 92.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a cup holder insert, comprising:
  a. a mug;
  b. a cup holder of a vehicle;
  c. an holder assembly, including a holder body being cylindrical in shape, wherein said holder body includes a hollow portion within said holder body, wherein said holder body includes a thickness extending into said hollow portion of said holder body, wherein said holder body includes a cut portion located vertically along said holder body, wherein said cut portion is rectangular in shape and extends from a top end of said holder body to a predetermined distance above a bottom end of said holder body, wherein said holder assembly is mounted within said cup holder of said vehicle;
  d. a support assembly, including a support body being cylindrical in shape, wherein said support body includes a diameter that cooperates with the diameter of said hollow portion of said holder assembly, wherein said support assembly is mounted within said holder assembly, wherein said support assembly includes a first protrusion located on a top end of said support assembly, wherein said first protrusion is hexagonal in shape and protrudes a predetermined distance out of the center of said top end of said support assembly, wherein said support assembly further includes a second protrusion protruding outwardly from a sidewall of said support assembly; and
  e. a cup holder assembly, including a cup holder body having a cylindrical shape, wherein the diameter of said cup holder body is significantly larger than the diameter of said holder assembly, wherein said cup holder body includes a cup holder hollow portion therein, wherein said cup holder assembly includes apertures located vertically along the diameter of a bottom end of said cup holder body, wherein said apertures are spaced equidistantly along said bottom end, wherein said apertures are hexagonal in shape, wherein said apertures receive said first protrusion entirely and remains flush therein, wherein said mug is placed within said cup holder hollow portion of said cup holder body.

2. The system for a cup holder insert of claim 1 wherein said holder body includes an outer rim having a slanted portion.

3. The system for a cup holder insert of claim 1 wherein said support assembly mounted within said holder assembly remains flush with said thickness of said holder assembly.

4. The system for a cup holder insert of claim 1 wherein said second protrusion is of a cubic-rectangular shape.

5. The system for a cup holder insert of claim 4 wherein said second protrusion is located a predetermined distance above a bottom end of said sidewall.

6. The system for a cup holder insert of claim 4 wherein said second protrusion is located a predetermined distance below a top end of said side wall, wherein said predetermined distance above said bottom end is less than said predetermined distance below said top end.

7. The system for a cup holder insert of claim 1 wherein said second protrusion is placed between said cut portion of said holder body.

8. The system for a cup holder insert of claim 1 wherein said cup holder assembly includes a cup holder cut portion being rectangular in shape along a portion of a lip of said cup holder body.

9. The system for a cup holder insert of claim 1 wherein said cup holder assembly includes circular openings along a diameter of a top surface of a bottom end of said cup holder body.

10. An apparatus for a cup holder insert, comprising:
   a. a holder assembly, including a holder body being cylindrical in shape, wherein said holder body includes a hollow portion within said holder body, wherein said holder body includes a thickness extending into said hollow portion of said holder body, wherein said holder body includes a cut portion located vertically along said holder body, wherein said cut portion is rectangular in shape and extends from a top end of said holder body to a predetermined distance above a bottom end of said holder body, wherein said holder body includes an outer rim having a slanted portion, wherein said holder assembly is mounted within said cup holder of said vehicle;
   b. a support assembly, including a support body being cylindrical in shape, wherein said support body includes a diameter that cooperates with the diameter of said hollow portion of said holder assembly, wherein said support assembly is mounted within said holder assembly, wherein said support assembly includes a first protrusion located on a top end of said support assembly, wherein said first protrusion is hexagonal in shape and protrudes a predetermined distance out of the center of said top end of said support assembly, wherein said support assembly further includes a second protrusion protruding outwardly from a sidewall of said support assembly, wherein said second protrusion is of a cubic-rectangular shape, wherein said second protrusion is mounted a predetermined distance above a bottom end of said sidewall, wherein said second protrusion is mounted a predetermined distance below a top end of said side wall, wherein said predetermined distance above said bottom end is less than said predetermined distance below said top end; and
   c. a cup holder assembly, including a cup holder body having a cylindrical shape, wherein the diameter of said cup holder body is significantly larger than the diameter of said holder assembly, wherein said cup holder body includes a hollow portion therein, wherein said cup holder assembly includes apertures located vertically along the diameter of a bottom end of said cup holder body, wherein said apertures are spaced equidistantly along said bottom end, wherein said apertures are hexagonal in shape, wherein said apertures receive said first protrusion entirely and remains flush therein, wherein said mug is placed within said hollow portion of said cup holder body.

\* \* \* \* \*